(12) United States Patent
Mitchell

(10) Patent No.: US 9,703,091 B2
(45) Date of Patent: Jul. 11, 2017

(54) MAGNIFICATION VIEWER LENS

(71) Applicant: Cleveland Darrell Mitchell, Toano, VA (US)

(72) Inventor: Cleveland Darrell Mitchell, Toano, VA (US)

( * ) Notice: Subject to any disclaimer, the term of this patent is extended or adjusted under 35 U.S.C. 154(b) by 32 days.

(21) Appl. No.: 14/702,821

(22) Filed: May 4, 2015

(65) Prior Publication Data

US 2015/0234174 A1 Aug. 20, 2015

Related U.S. Application Data

(63) Continuation-in-part of application No. 14/320,928, filed on Jul. 1, 2014, now abandoned.

(60) Provisional application No. 61/841,680, filed on Jul. 1, 2013.

(51) Int. Cl.
| | |
|---|---|
| *G02B 27/02* | (2006.01) |
| *G02B 25/00* | (2006.01) |
| *G02B 7/02* | (2006.01) |
| *G02B 3/08* | (2006.01) |

(52) U.S. Cl.
CPC ............. *G02B 25/005* (2013.01); *G02B 3/08* (2013.01); *G02B 7/023* (2013.01); *G02B 27/027* (2013.01); *G02B 27/028* (2013.01)

(58) Field of Classification Search
CPC . G02B 7/02; G02B 7/023; G02B 7/04; G02B 27/02; G02B 27/021; G02B 27/022; G02B 27/025; G02B 27/027; G02B 27/028; G02B 25/002; G02B 25/005; B60K 2350/20; B60K 2350/206; B60K 2350/2056; B60K 2350/2086; B60K 2350/2095
USPC ........ 224/567, 570; 359/802, 809, 810, 811, 359/818
See application file for complete search history.

(56) References Cited

U.S. PATENT DOCUMENTS

| | | | | |
|---|---|---|---|---|
| 3,955,884 A | * | 5/1976 | Del Pesco, Sr. ..... | G02B 25/005 359/804 |
| D488,493 S | * | 4/2004 | Stachowski ................ | D16/135 |
| 2008/0055745 A1 | * | 3/2008 | Huang .................... | G02B 7/002 359/811 |

* cited by examiner

*Primary Examiner* — Scott J Sugarman
*Assistant Examiner* — Gary O'Neill
(74) *Attorney, Agent, or Firm* — Daniel Boudwin; Global Intellectual Property Agency, LLC.

(57) ABSTRACT

A magnification viewer lens device is provided that is used to magnify objects when viewed through the device. The device comprises a magnification lens housing supporting a magnification lens, whereby the housing is supported along its perimeter by an arm assembly. The arm assembly comprises an elongated arm and a clamp, whereby the arm assembly is rotatable relative to the housing and to the clamp. The clamp forms a rounded clamping member that is suitable for securing the device to a golf cart steering wheel or alternate support. The arm and the housing remains static relative to the hinge joints of the arm using friction hinges, while the housing supports a Fresnel lens for magnifying objects when viewed therethrough. In one embodiment, the housing is substantially rectangular and the arm and clamp are designed to secure the housing over the scorecard area of a golf cart steering wheel.

13 Claims, 7 Drawing Sheets

MAGNIFICATION VIEWER LENS

CROSS REFERENCE TO RELATED APPLICATION

This application is a continuation-in-part application of U.S. patent application Ser. No. 14/320,928 filed on Jul. 1, 2014, which claims benefit of U.S. Provisional Application No. 61/841,680 filed on Jul. 1, 2013. The above identified patent applications are hereby incorporated by reference in their entirety to provide for continuity of disclosure.

BACKGROUND OF THE INVENTION

Field of the Invention

The present invention relates to magnification viewers. More specifically, the present invention relates to an affixable magnification device that can be used for improving the user's ability to read smaller print and for affixing the magnification device to an exposed support on a vehicle, cart, or support. Contemplated uses include attachment to golf cart steering wheels for magnifying score cards, attachment to grocery carts for magnifying grocery lists or labels, or alternative uses in which magnification is desired and a cart, vehicle, or support is provided.

The present invention relates to an adjustable magnifying viewer adapted for several applications, and in an exemplary case, for use in conjunction with a golf cart steering wheel. The device comprises a magnifying viewer lens that is clamped onto the steering wheel of a golf cart. The device comprises an adjustable and extendable arm that attaches the magnifying viewer lens to the steering wheel via a rounded clamp, whereby the viewer and the lens is positionable over the steering wheel center. This location is traditionally where scorecards are maintained. The device secures to the steering wheel along its perimeter and therefore turns with the steering wheel, while the viewer lens is positionable over the score card and a lens magnifies the contents thereof.

In addition to be supportable by the steering wheel or another support, it is contemplated that the magnifying viewer lens may be detachable therefrom and held by hand or stowed independently from the arm assembly. Once removed, the assembly can be drawn closer to the user to view objects independent of the support. Finally, it is contemplated that the device may be attachable to general supports and not necessarily to a golf cart or a steering wheel. Description of the invention in conjunction with a steering wheel and golf cart is not meant to be limiting in any respect, but one contemplated use out of many. Alternate uses include attachment of the arm assembly to a different cart or to a general support, or use of the device in different environments. These include attachment to grocery carts or grocery baskets, or attachment to other, alternative supports.

SUMMARY OF THE INVENTION

The following summary is intended solely for the benefit of the reader and is not intended to be limiting in any way. The present invention provides a new magnification viewer lens device that can be utilized for providing convenience for the user when magnifying an underlying object when viewing the object through the lens of the device, and for attaching the magnification viewer lens device to an existing support.

It is an object of the present invention to provide a magnification viewer lens device that comprises a lens housing having a perimeter and an open interior that supports a magnification lens within the open interior. The device further comprises an arm assembly coupled to the lens housing along the perimeter thereof, whereby the arm assembly comprises an elongated arm and a clamp that is adapted to support the magnification viewer lens device from a support.

Another object of the present invention is to provide an elongated arm with a first end coupled to the perimeter of the lens housing and a second end coupled to a clamp, whereby the first end of the elongated arm being rotatably coupled to the lens housing using a first hinge joint and the second end of the elongated arm is rotatably coupled to the clamp using a second hinge joint.

Another object of the present invention is to provide an elongated arm with a first hinge joint and a second hinge joint that each may comprise a friction hinge that allows rotation about a center of the respective hinge joint and static placement of thereof in a desired orientation.

Yet another object of the present invention is to provide an elongated arm with a first hinge joint and a second hinge joint that are each formed from a pair of pair of captive tabs within complimentary groves. Each pair captive tabs is aligned and shares a common centerline to allow the lens housing to rotate relative to the first hinge joint and the clamp to rotate about the second hinge joint.

Another object of the present invention to provide a magnification viewer lens device with a housing that further comprises a top shell portion and a bottom shell portion, which sandwiches a magnification lens therebetween.

Another object of the present invention to provide a magnification viewer lens device whereby the housing further comprises a substantially rectangular shape and the magnification lens further comprises a Fresnel lens.

Another object of the present invention to provide a magnification viewer lens device whereby the elongated arm is formed of an arm upper portion and an arm lower portion that are fastened together.

Another object of the present invention to provide a magnification viewer lens device in which the clamp further comprises a first clamp portion and a second clamp portion. The first clamp portion and the second clamp portion each comprise a clevis with a central axis that share the same center point as the central axis of the second hinge joint. In this manner the central axis of clevises are aligned with one another and further aligned with the central axis of the second hinge joint such that the first clamp portion and the second clamp portion rotate from the central axis of the second hinge joint.

Another object of the present invention to provide a clamp that further comprises a clamp latch adapted to secure the first clamp portion to the second clamp portion and form a substantially closed clamp with an open interior.

Another object of the present invention to provide a clamp that further comprises a substantially rounded shape and the first clamp portion and the second clamp portion each comprise a substantially rounded shape. The clamp forms a rounded and the open interior when closed that includes an inner diameter.

Another object of the present invention to provide a clamp in which the inner diameter of the open interior of the closed clamp may be adapted to receive and clamp the steering wheel of a golf cart therein.

Another object of the present invention to provide a clamp in which the first clamp portion and the second clamp portion each comprise a pair of clevises that are aligned with each other and aligned with the central axis of the second hinge joint.

Another object of the present invention to provide a clamp latch that is hingedly attached to the second clamp portion at a pin joint and is spring biased about the pin joint.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
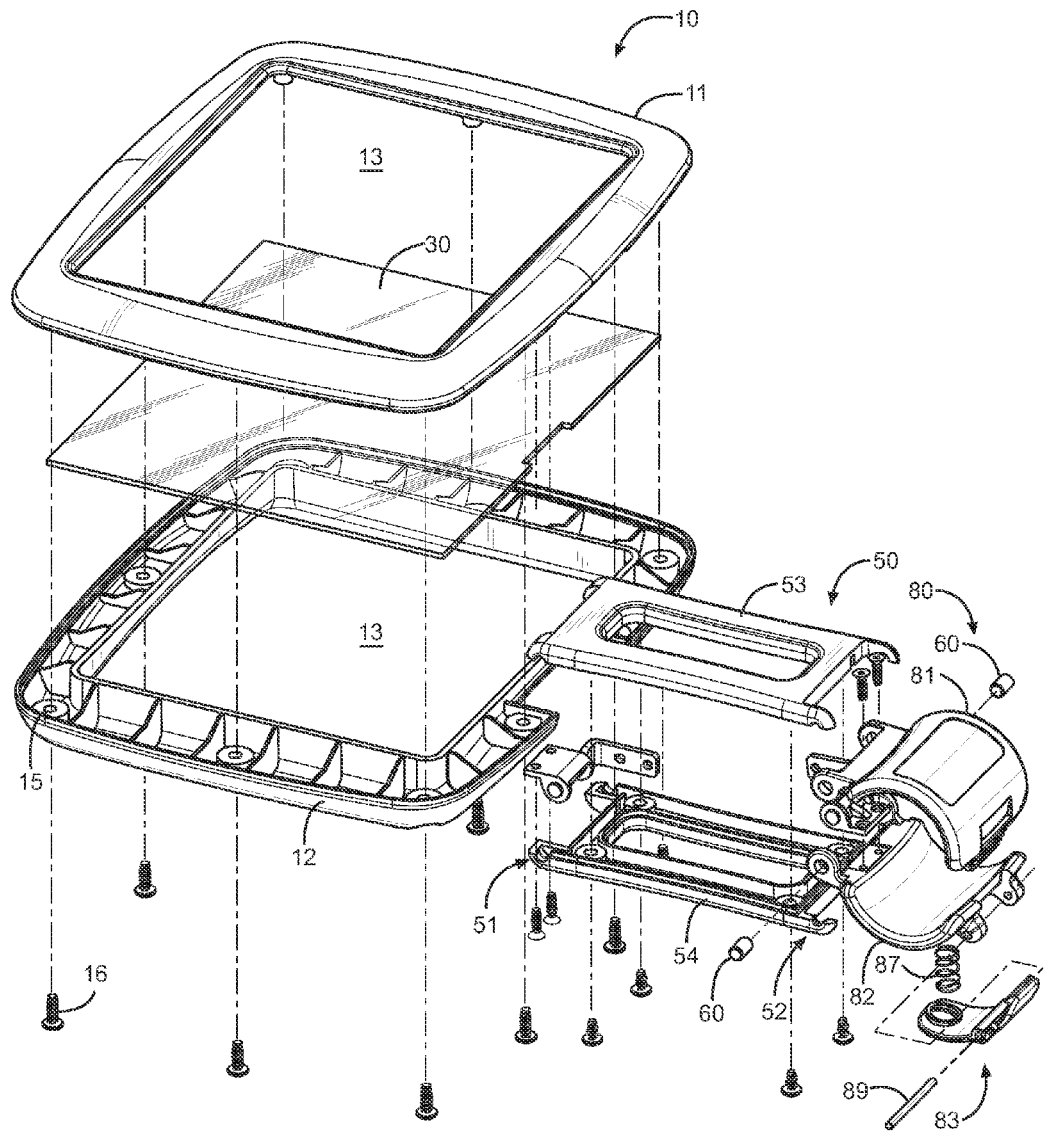
FIG. 1 shows an exploded view of one embodiment of the magnification viewer lens device of the present invention.
Figure 2:
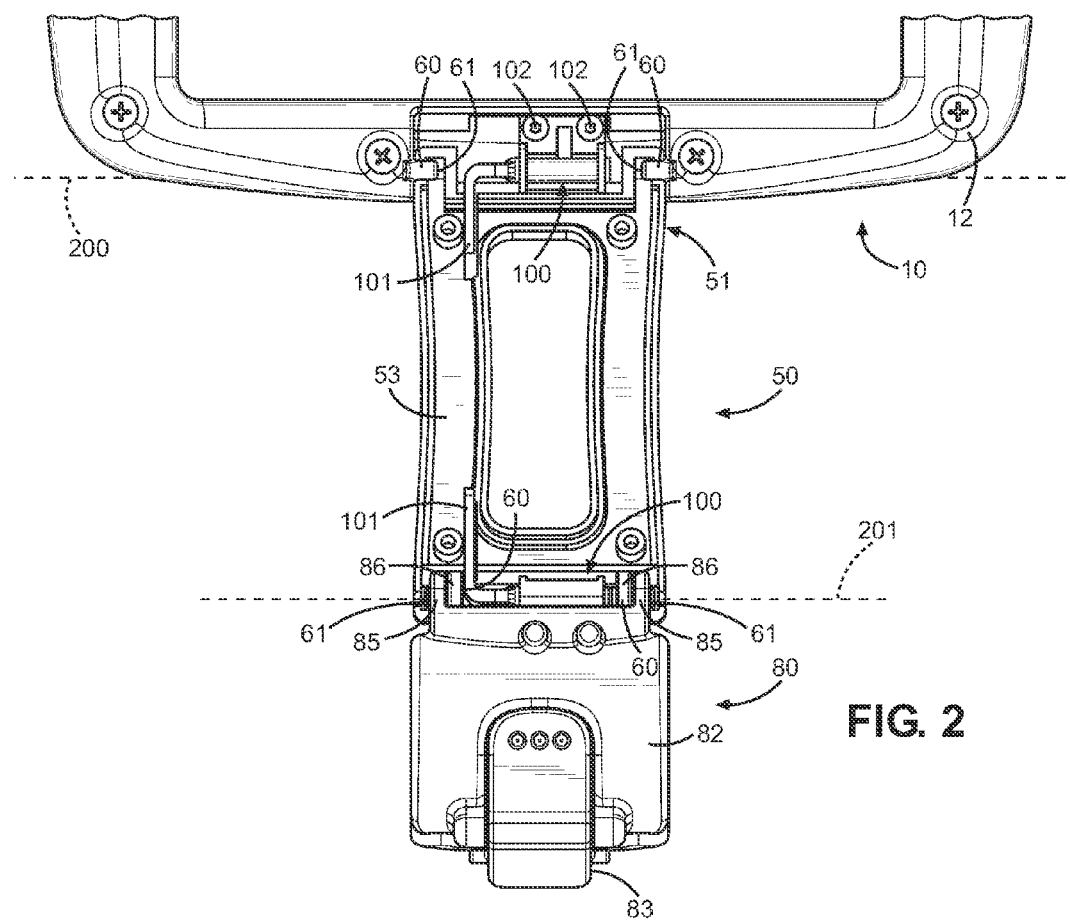
FIG. 2 shows a view of the arm assembly in connection with the lens assembly and the clamp, whereby the arm lower portion removed to show the first hinge joint, the second hinge joint, and the friction hinges disposed within the first hinge joint and the second hinge joint.
Figure 3:
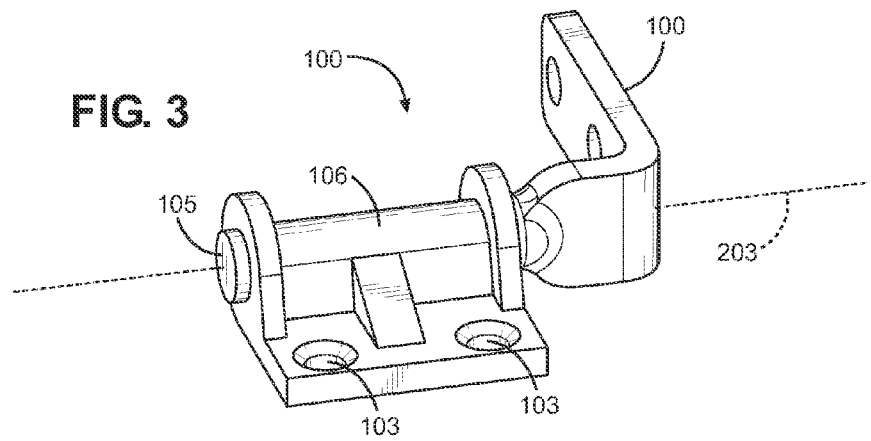
FIG. 3 shows a view of an exemplary friction hinge device deployed within the first hinge joint and the second hinge joint.
Figure 4:
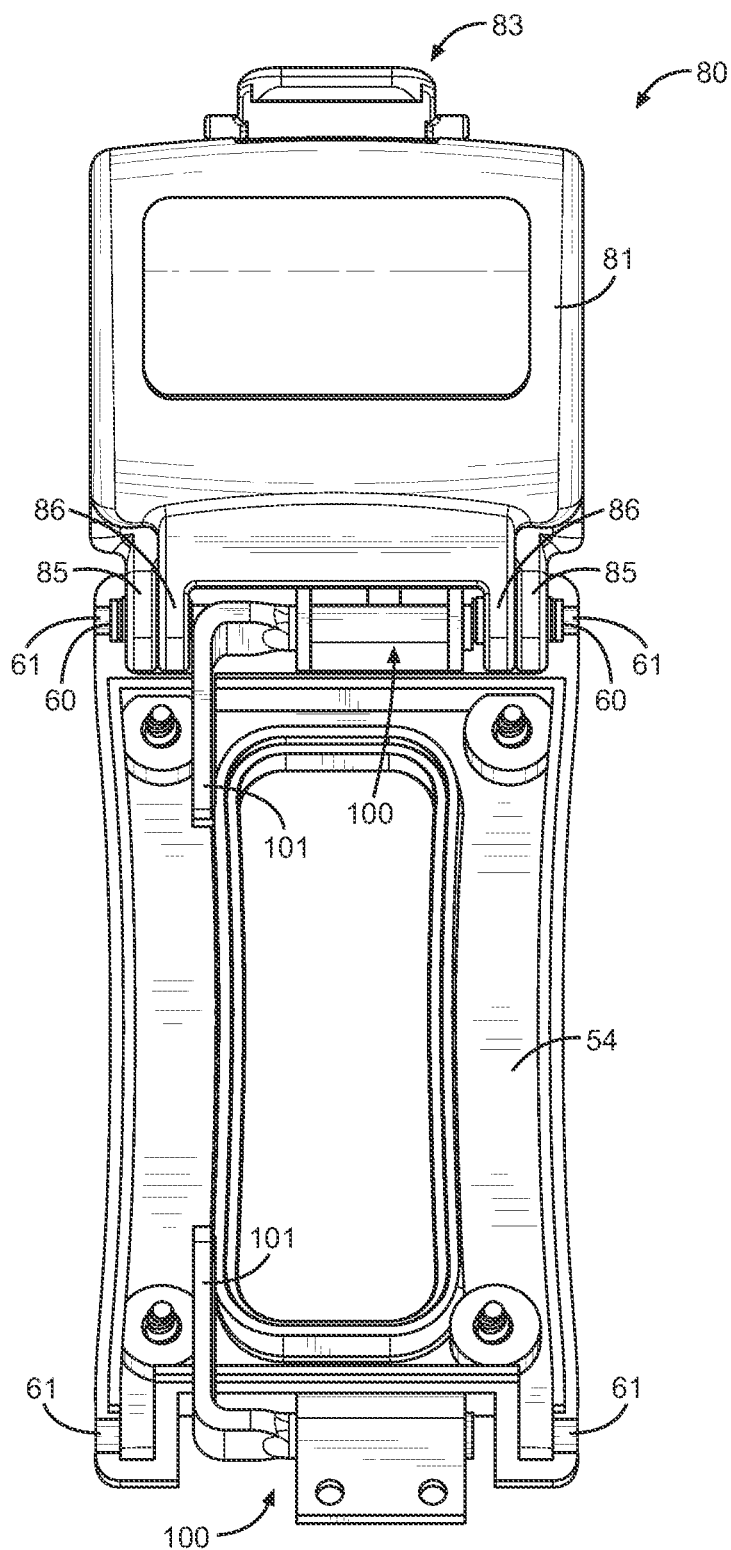
FIG. 4 shows another view of the arm assembly, whereby the arm upper portion is removed to show the second hinge joint in greater detail between the second end of the elongated arm and the clamp.
Figure 5:
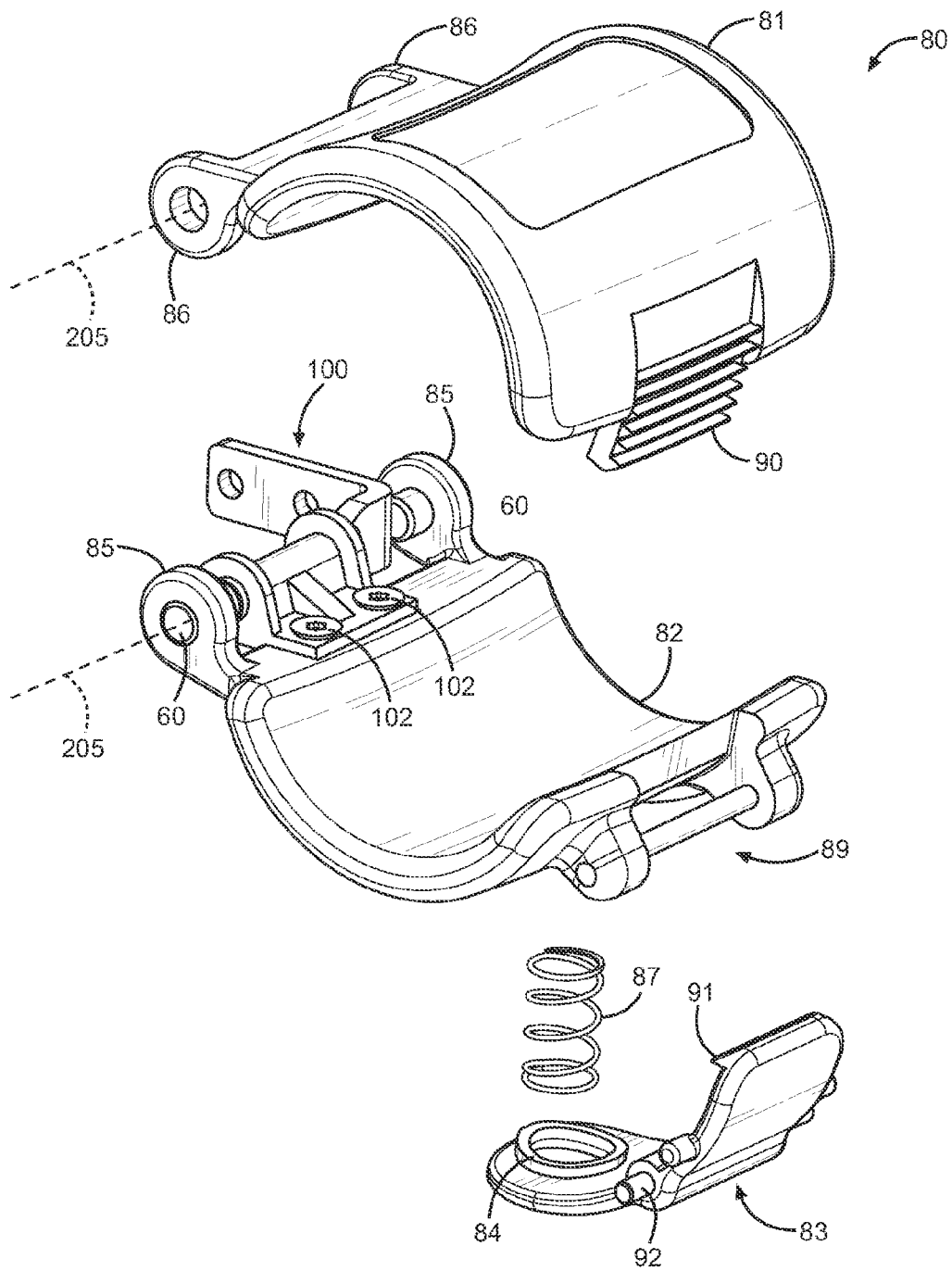
FIG. 5 shows an exploded view of the clamp.
Figure 6:
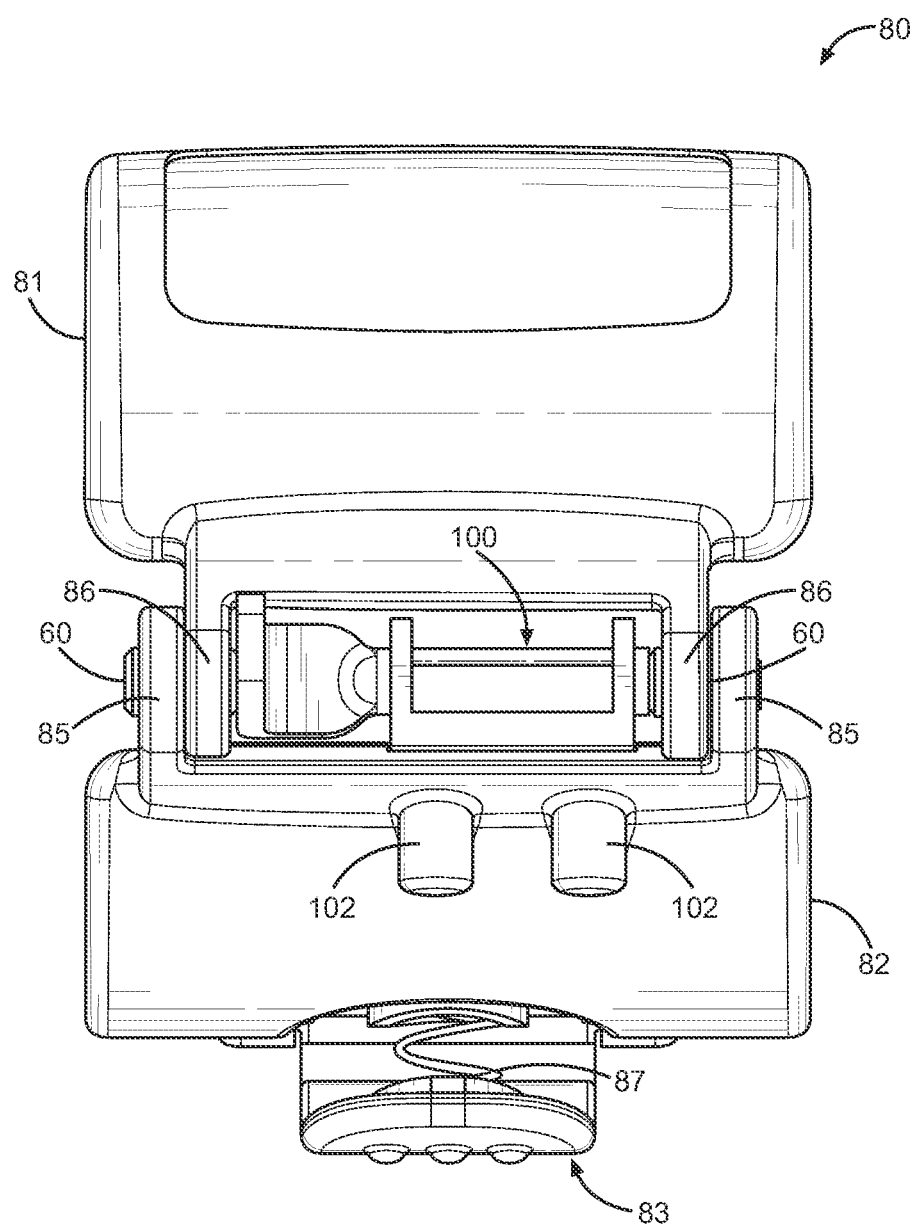
FIG. 6 shows an end view of the clamp from the perspective of the second end of the elongated arm.

Reference is made herein to the attached drawings. Like reference numerals are used throughout the drawings to depict like or similar elements of the magnification viewer device of the present invention. For the purposes of presenting a brief and clear description of the present invention, the preferred embodiment will be discussed as used for magnifying objects when viewed through the device, and for affixing the device to a support. The figures are intended for representative purposes only and should not be considered to be limiting in any respect.

Referring now to FIG. 1, there is shown an exploded view of the magnification viewer device of the present invention. The device comprises a lens housing 10 supporting a magnification lens 30 therein. The housing 10 is supported by an arm assembly 50, which comprises an elongated arm with a first end 51 and a second end 52. The second end 52 of the elongated arm connects to a clamp 80 that is adapted to secure to or secure around an external structure, thereby supporting the arm assembly 50 and the housing 10 from the structure.

The present invention provides a magnification viewer that is adapted to be supported by a structure and positioned above an item or sheet of material in which the user wishes to inspect using a magnified view. The housing 10 supports a substantially planar magnification lens 30, which magnifies objects placed under the lens 30 when views from the opposite side of the lens 30. The environments in which the magnification viewer device may be deployed are diverse, however specifically contemplated examples include attachment of the clamp 80 to the steering wheel of a golf cart for viewing scorecards on the wheel, and attachment to a grocery cart for viewing grocery lists or food articles. These examples are nonlimiting and considered two of many possible uses of the claimed invention.

The housing 10 comprises a perimeter and an open interior 13, whereby the magnification lens 30 is supported within the open interior 13 and the perimeter of the housing 10 prevents the lens 30 from separating from the housing 10. In one embodiment, the housing 10 is substantially rectangular and formed from a top shell portion 11 and a bottom shell portion 12 that are fastened together and support the magnification lens 30 therebetween. A plurality of fastener holes 15 and fasteners 16 are used to secure the shell portions together while maintaining the lens 30 therebetween.

The arm assembly 50 is shown in greater detail in FIGS. 1-4. The arm assembly 50 comprises an elongated arm with a first end 51 that secures to the housing 10 along its perimeter. The second end 52 of the elongated arm secures to the clamp 80. The first end 51 and second end 52 connections form a first hinge join and a second hinge joint, respectively. The hinge joints rotatably connect the ends of the elongated arm to the housing 10 and to the clamp 80, whereby the housing 10 and clamp 80 can rotate relative to the elongated arm and be rotatably positionable relative thereto. The hinge joints further comprise friction joints that allow the hinge joints to maintain a desired position when rotated, whereby the user can angle the housing 10 and the clamp 80 relative to the elongated arm, whereafter the housing 10, elongated arm, and clamp 80 remain static after being positioned.

The first end 51 of the elongated arm forms the first hinge joint using a pair of captive tabs 60 within complimentary grooves 61 disposed within the first end 51 of the arm. The grooves 61 comprise elongated channels a shared central axis 200, whereby the central axis of both grooves 61 of the arm first end are aligned to form a first hinge center. Tabs 60 extend into the grooves 61 from the housing 10 and allow the housing 10 to rotate from the grooves 61 about the first hinge center.

Likewise the second end 52 of the elongated arm forms the second hinge joint between the arm assembly 50 and the clamp 80 using a pair of aligned tabs 60 disposed within grooves 61. The grooves 61 of the second end 52 similarly comprise elongated channels a shared central axis 201, whereby the central axis of both grooves 61 of the arm second end 52 are aligned to form a second hinge center. The tabs 60 along the arm second end 52 form a second hinge joint about which the clamp 80 is able to rotate. The clamp 80 includes a first clamp portion 81 and a second clamp portion 82, each having at least one clevis member 85, 86 that is engaged by the captive tabs 60 of the second end 52. The clamp portions therefore are able to rotate relative to each other and relative to the second end 52 of the arm assembly 50 about the central axis of the aligned tabs 60.

It is desired that when the user positions the lens 30 over an object, the housing 10, the arm assembly 50, and the clamp 80 remain statically disposed after being positioned thereover. Therefore, the first and second hinge joints remain static after being maneuvered by the user. To accomplish this, a first and second friction hinge assembly 100 is disposed within the first 51 and second 52 end of the arm assembly 50. The friction hinge assembly 100 comprises an elongated hinge arm 101 that extends within the arm assembly interior and is frictionally held by a cylindrical housing 106 that counteracts rotation of the hinge arm 101. Specifically, the hinge arm 101 comprises a substantially L-shaped member with a portion 105 thereof disposed within the hinge housing 106, which is frictionally held thereby. Rotation of the interior portion 105 is resisted, therefore movement against the hinge arm 101 is resisted below a given threshold. Therefore, the hinge arms 101 support the position of the first and second ends of the arm assembly and maintain the position of the hinges when not being forcibly repositioned by the user.

The friction hinge assemblies 100 are fastened to the housing 10 and to the clamp 80, while the hinge arm 101 extends into the arm assembly interior. Fasteners 102 extend through fastener holes 103 in the base of the friction hinge assemblies to stabilize each against the housing 10 and the clamp 80. The center of rotation 203 of the friction hinge assemblies 100 are aligned within the central axis 200 of the first hinge joint and the central axis 201 of the second hinge joint, respectively.

Similar to the housing 10, the arm assembly may be formed of an arm upper portion 53 and an arm lower portion 54 that are fastened together and form halves of the arm assembly 50. The aligned grooves 61 of the first end 51 and second end 52 of the arm assembly are formed when the portions are joined together, thereby supporting the captive tabs 60 and the clevis members of the clamp 80. The hinge arms 101 of the friction hinge assemblies are supported within the interior of the arm assembly, whereby the hinge arms 101 bear on the interior surfaces of the arm assembly portions to resist motion after the user has positioned the housing 10, the arm assembly 50, and the clamp 80 in a desired position.

Referring to FIGS. 1-6, there are shown views of the clamp assembly 80 and its components. The clamp 80 preferably comprises a first clamp portion 81 and a second clamp portion 82 that are rotatable relative to one another about the captive tabs 60 second hinge joint (i.e. the second end 52 of the arm assembly 50). The first clamp portion 81 and a second clamp portion 82 may comprise rounded members that form a rounded clamp with an open interior when joined together, whereby the clamp portions are securable to one another to clamp around a support structure.

Each clamp portion comprises at least one clevis member 85, 86, whereby the clevis members align with one another and align with the clevis member of the opposing clamp portion. The aligned clevis members have a central axis 205 and the clevis members are offset along the central axis 205 relative to one another and relative to the opposing clamp portion. This allows the clevis 86 of the first clamp portion 81 to align with the clevises 85 of the second clamp portion 82 to form a unified central axis that is aligned with the tabs 60, friction hinge assembly 100, and the second hinge joint of the arm assembly. This allows the clamp portions to rotate relative to one another and relative to the arm assembly from a single axis.

The first clamp portion 81 is securable to the second clamp portion using a clamp latch 83. The clamp latch 83 is a spring 87 biased assembly that latches to a latch receiver 90, whereby the latch 83 extends between the clamp portions. In one configuration, the clamp latch 83 is rotates about a pin joint 89 along the second clamp portion 82, whereby the working end 91 of the clamp is biased to engage the latch receiver portion 90 of the opposing clamp portion 81. The latch 83 includes a biased end 84 that is pressed outward from the second clamp portion 82 by a spring 87, as well as a latch working end 91 that engages the receiver portion 90 of the opposing clamp portion 81. The receiver portion 90 may comprise a ladder strap arrangement, while the working end 91 of the latch 83 includes a catch to engage the ladder strap receiver portion 90. In this way, the ends of the clamp portions can be pressed together after being placed around a support structure, whereby the ends of the clamp portions secure to one another using the latch 83 and receiver 90 arrangement. This is one configuration contemplated by the claimed invention. Alternative clamp arrangements are contemplated, falling within the scope of securing two clamp portions together around a structure. Once clamped to the structure, the friction hinge assembly 100, fastened 102 to the second clamp portion 82, prevents unwanted rotation of the arm assembly relative to the clamp 80.

Figure 7:
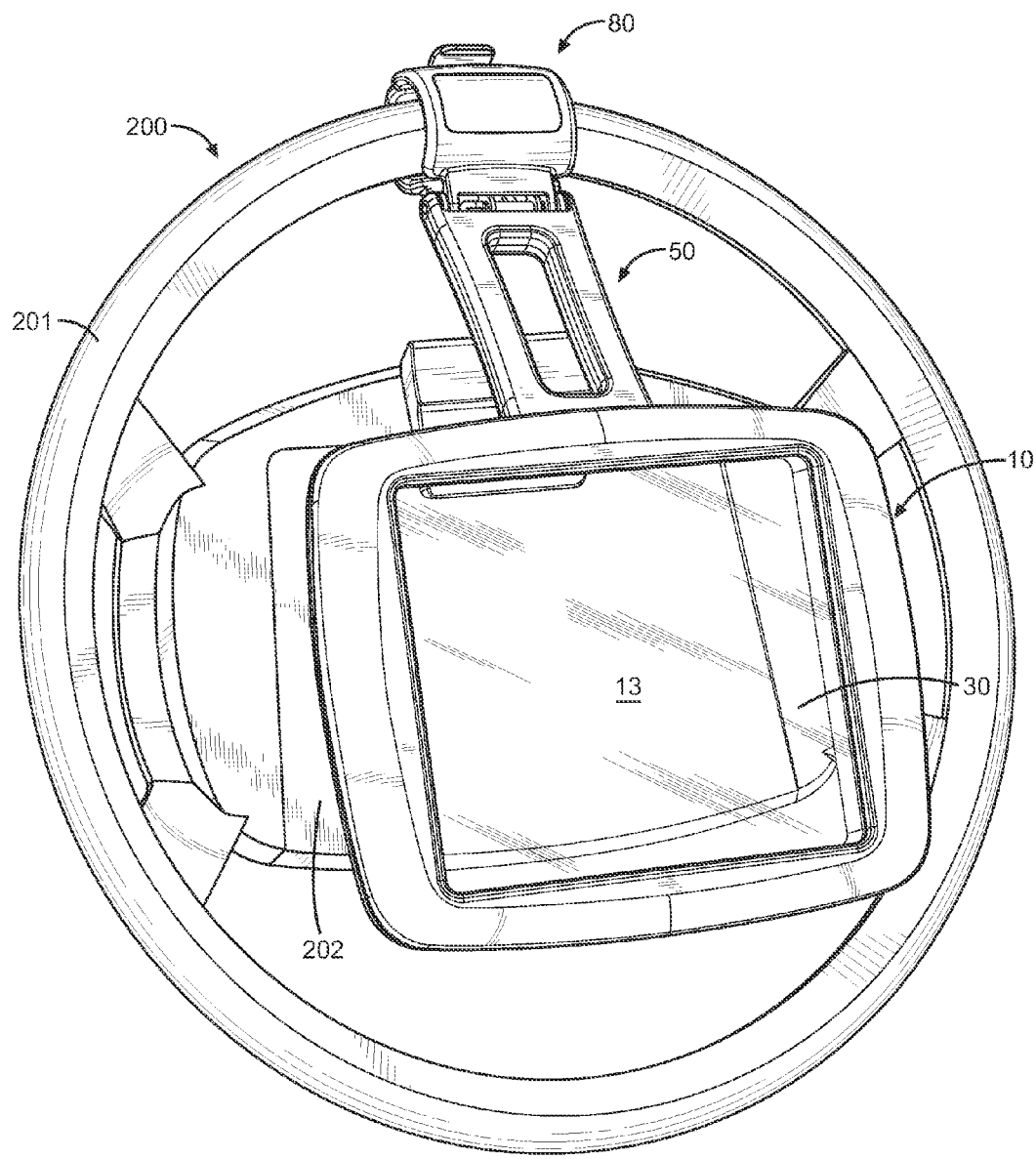
FIG. 7 shows the magnification viewer lens device in connection with a golf cart steering wheel, whereby the lens housing is positioned over the central scorecard portion of the steering wheel.
Figure 8:
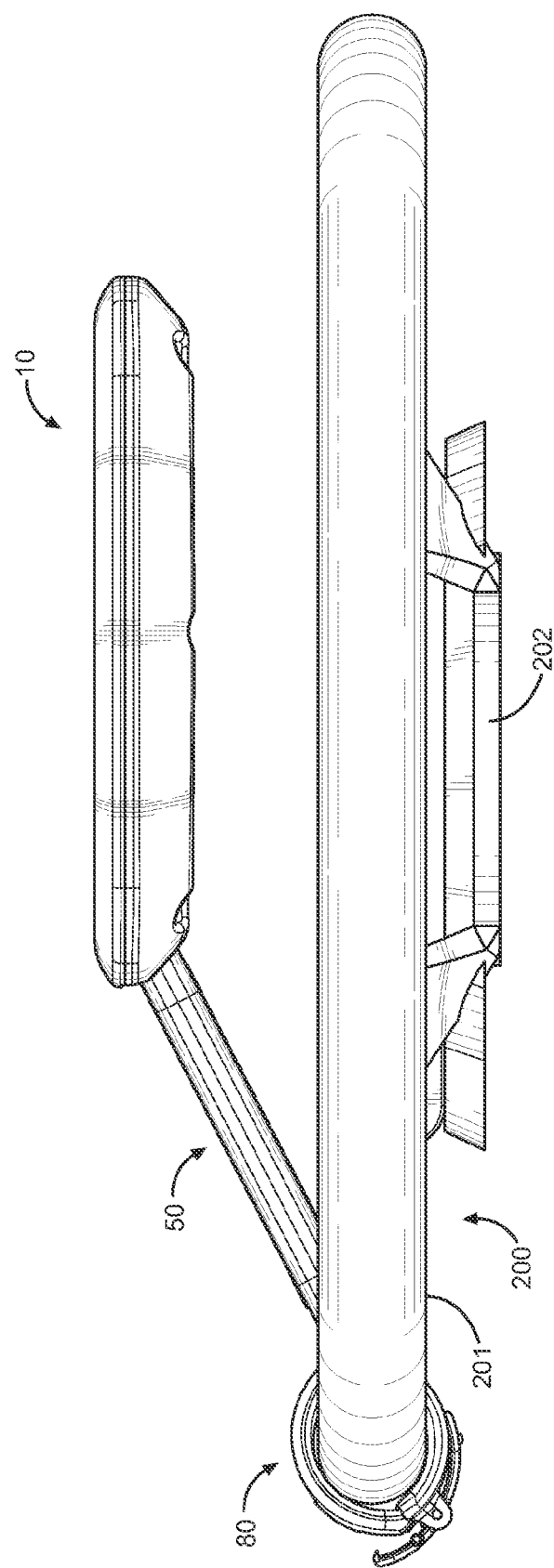
FIG. 8 shows a side view of the magnification viewer lens device affixed to a golf cart steering wheel and disposed in a static position relative to the scorecard portion of the steering wheel.

Referring now to FIGS. 7-8, there are shown two views of the present invention in a working state and in one contemplated environment. Specifically, the magnification viewer device is connected to a golf cart steering wheel 200, whereby the lens 30 of the housing 10 is disposed over the center 202 of the steering wheel 200. This portion of the steering wheel is generally used to support a scorecard, therefore the user can position the housing 10 over the scorecard, peer through the open interior 13 of the housing, and use the magnification lens 30 to magnify the writing on the scorecard when desired.

The magnification lens 30 comprises planar lens, and preferably comprises a Fresnel lens. Fresnel lens are generally thin and formed of sheets for magnifying objects when viewed therethrough. The lens 30 of the present invention is supported by the housing 10 within its open interior 13, and the lens 30 can be positioned relative to an object to be viewed by oriented the housing 10 relative thereto. The focal length of the lens 30 and thus the clarity/magnification level are adjusted by moving the housing relative to the object being viewed. In the case of FIGS. 7-8, the housing 10 is positioned over a score card on the steering wheel 200 and can be moved toward or away from the scorecard by adjusting the arm assembly 50, the clamp 80 position, and the housing 10 angle relative thereto.

The clamp 80 secures around the steering wheel perimeter 201, while arm assembly 50 is oriented towards the steering wheel center 201. The housing is positioned thereover, and the clamp 80 remains statically secured to the steering wheel perimeter 201. Similarly, the friction hinge assemblies maintain the position of the arm assembly 50 and the orientation of the housing 10 once positioned by the user. This allows the magnification device to remain static and in a desired location relative to the steering wheel after being positioned by the user. The device rotates with the steering wheel and the user can view the scorecard through the lens 30 when desired. Of course, this arrangement is but one environment in which the device may be employed. Any structure may be used as a support for the device when magnification of an object and hands-free use of the magnification device is desired.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A magnification viewer lens device, comprising:
a lens housing having a perimeter and an open interior;
the lens housing supporting a magnification lens within its open interior;
an arm assembly coupled to the lens housing along the perimeter thereof;
the arm assembly comprising an elongated arm with a first end coupled to the perimeter of the lens housing and a second end coupled to a clamp;
the first end of the elongated arm being rotatably coupled to the lens housing using a first hinge joint;
the second end of the elongated arm being rotatably coupled to the clamp using a second hinge joint;
the clamp including a first clamp portion and a second clamp portion;
a latch receiver portion disposed on a first end of the first clamp portion; and
a clamp latch rotatably coupled to a pin joint disposed on a first end of the second clamp portion, the clamp latch including a spring, a latch working end, and a biased end;
wherein the spring is positioned between the biased end and the second clamp portion;
wherein the latch working end is configured to engage the latch receiver portion;
wherein the biased end is biased outwardly relative to the second clamp portion;
wherein the clamp is configured to be removably secured to a portion of a steering wheel such that the magnification lens is disposed over a center portion of the steering wheel for magnifying an object placed thereon.

2. The magnification viewer lens device of claim 1, wherein:
the first hinge joint further comprises a friction hinge that allows rotation about a center of the first hinge joint and static placement of the first hinge joint in a desired orientation.

3. The magnification viewer lens device of claim 2, wherein:
the friction hinge further comprises a friction hinge assembly having an elongated hinge arm that extends into the arm assembly, and the hinge arm is frictionally held by a housing that frictionally holds the hinge arm to counteract rotation thereof.

4. The magnification viewer lens device of claim 1, wherein:
the second hinge joint further comprises a friction hinge that allows rotation about a center of the second hinge joint and static placement of the second hinge joint in a desired orientation.

5. The magnification viewer lens device of claim 4, wherein:
the friction hinge further comprises a friction hinge assembly having an elongated hinge arm that extends into the arm assembly, and the hinge arm is frictionally held by a housing that frictionally holds the hinge arm to counteract rotation thereof.

6. The magnification viewer lens device of claim 1, wherein:
the first hinge joint and the second hinge joint are each formed of a pair of captive tabs within complimentary grooves, whereby each pair of captive tabs is aligned and shares a common centerline.

7. The magnification viewer lens device of claim 1, wherein:
the lens housing is defined by a top shell portion and a bottom shell portion, the top shell portion and the bottom shell portion being removably attachable to one another;
wherein the top shell portion and the bottom shell portion define the perimeter and the open interior of the lens housing when attached;
the magnification lens being fastened between the top shell portion and the bottom shell portion over the open interior.

8. The magnification viewer lens device of claim 1, wherein the housing further comprises a substantially rectangular shape.

9. The magnification viewer lens device of claim 1, wherein the magnification lens further comprises a Fresnel lens.

10. The magnification viewer lens device of claim 1, wherein the elongated arm includes an upper portion and a lower portion that are removably attachable to one another, the upper portion and the lower portion being positioned between the top shell portion and the bottom shell portion of the lens housing.

11. The magnification viewer lens device of claim 1, wherein:
the first clamp portion and the second clamp portion each include a clevis disposed at a second end thereof, each clevis having a central axis;
the second hinge joint further comprises a central axis;
the central axis of clevises being aligned with one another and further being aligned with the central axis of the second hinge joint such that the first clamp portion and the second clamp portion rotate from the central axis of the second hinge joint.

12. The magnification viewer lens device of claim 11, wherein:
the first clamp portion and the second clamp portion each comprise a substantially rounded shape such that the closed clamp is rounded and the open interior includes an inner diameter.

13. The magnification viewer lens device of claim 11, wherein the first clamp portion and the second clamp portion each comprise a pair of clevises.

* * * * *